United States Patent
Hara

(10) Patent No.: US 12,379,926 B2
(45) Date of Patent: Aug. 5, 2025

(54) IMAGE PROCESSING APPARATUS WITH MULTIBANK REGISTERS FOR STORING SOURCE, DESTINATION, AND SETTING INFORMATION FOR OPERATIONAL CIRCUITS

(71) Applicant: CANON KABUSHIKI KAISHA, Tokyo (JP)

(72) Inventor: Takayuki Hara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/350,022

(22) Filed: Jul. 11, 2023

(65) Prior Publication Data
US 2024/0028331 A1    Jan. 25, 2024

(30) Foreign Application Priority Data
Jul. 25, 2022   (JP) .................................. 2022-118155

(51) Int. Cl.
| | |
|---|---|
| G06F 9/30 | (2018.01) |
| G06F 9/34 | (2018.01) |
| G06F 9/38 | (2018.01) |
| G06T 1/20 | (2006.01) |

(52) U.S. Cl.
CPC ............ *G06F 9/30101* (2013.01); *G06F 9/34* (2013.01); *G06F 9/3824* (2013.01); *G06F 9/3877* (2013.01); *G06T 1/20* (2013.01)

(58) Field of Classification Search
CPC ...... G06F 9/30101; G06F 9/34; G06F 9/3824; G06F 9/3877; G06T 1/20
See application file for complete search history.

(56) References Cited

U.S. PATENT DOCUMENTS

2007/0011439 A1*  1/2007  Kim .................... G06F 9/3814
                                                        712/E9.055

FOREIGN PATENT DOCUMENTS

| JP | H11-53526 A | 2/1999 |
| JP | 2007-310721 A | 11/2007 |

OTHER PUBLICATIONS

NVIDIA Compute—PTX: Parallel Thread Execution—ISA Version 1.4, Mar. 31, 2009, 133 pages.*
Wikipedia, "System on a chip", Jul. 11, 2021, pp. 1-14.*

* cited by examiner

*Primary Examiner* — David J. Huisman
(74) *Attorney, Agent, or Firm* — Venable LLP

(57) ABSTRACT

An image processing apparatus includes a central processing unit (CPU), an image processor, multiple bus masters, and a memory, all interconnected through a system bus. The image processor includes a control circuit executing a program stored in an embedded program memory that allows the CPU to write data. The image processor also includes operational circuits that perform specific operations on input data and produce operation results. The results are temporarily stored in internal memories. The apparatus includes registers that hold various information, input sources, output destinations, and setting information for each operational circuit. A selection circuit selects, based on the information of the registers, the memory, or the internal memories, as an input source of image data for each operational circuit and the memory, or one of the internal memories, as the output destination for the operation results.

13 Claims, 7 Drawing Sheets

IMAGE PROCESSING APPARATUS WITH MULTIBANK REGISTERS FOR STORING SOURCE, DESTINATION, AND SETTING INFORMATION FOR OPERATIONAL CIRCUITS

CROSS REFERENCE TO PRIORITY APPLICATION

This application claims the benefit of Japanese Patent Application No. 2022-118155, filed on Jul. 25, 2022, which is hereby incorporated by reference herein in its entirety.

BACKGROUND OF THE INVENTION

Field of the Invention

The present invention relates to an image processing apparatus and an image processing circuit.

Description of the Related Art

In recent digital camera products represented by digital still cameras, digital video cameras, surveillance cameras, onboard cameras, and the like, image processing apparatuses that can execute complex image processing are implemented. In an image processing apparatus, typically, various image processing circuits are implemented and a combination of image processing circuits that are appropriate for the processing to be executed is used.

When processing that cannot be executed by the image processing apparatus only is required, the processing that can be executed by the image processing apparatus is executed by the image processing apparatus, and the processing result is written to an external large-capacity memory such as a dynamic random access memory (DRAM) or the like. Then, a circuit or software different from the image processing apparatus is applied to the intermediate processing result to execute the processing that cannot be executed by the image processing apparatus only. Note that further processing may be executed by the image processing apparatus on the intermediate processing result after the different circuit or software is applied. However, with this method, since the intermediate processing result needs to be written to a large-capacity memory, the free capacity and access bandwidth of the large-capacity memory is used up.

Regarding this problem, various solutions have been proposed. For example, a method described in Japanese Patent Laid-Open No. 2007-310721 and in Japanese Patent Laid-Open No. H11-53526 includes implementing a change in function by configuring an image processing circuit at a programmable circuit known as a Digital Signal Processor (DSP) instead of using an image processing circuit with a function that cannot be changed.

In other known methods, a programmable circuit such as a Field Programmable Gate Array (FPGA) and a General Purpose Graphic Processing Unit (GPGPU) is used instead of a DSP.

However, when using a DSP, the processing speed of the DSP restricts the processing speed of the image processing. Thus, to implement high-speed image processing, a DSP with high performance that can collectively execute processing of tens of images per clock is required. Alternatively, to compensate for the lower processing power of the DSP, a plurality of DPSs must be used. In either case, the increase in circuit size is a problem.

An FPGA has more flexibility in operations and a higher processing speed than a DSP. However, an FPGA has a circuit size from approximately ten to twenty times greater than that of an image processing circuit with a function that cannot be changed. Also, a similar problem as when a plurality of DSPs are used arises when a GPGPU is used.

SUMMARY OF THE INVENTION

The present invention has been made in consideration of the aforementioned background, and realizes, in a first aspect, a technique for executing various types of image processing with a relatively small circuit and suppressing access to a memory while maintaining a certain amount of flexibility.

According to an aspect, the present invention provides an image processing apparatus comprising a CPU connected to a system bus, an image processor connected to the system bus, a plurality of bus masters connected to the system bus, and a memory connected to the system bus and accessed by the CPU, the plurality of bus masters and the image processor via the system bus, wherein the image processor includes a control circuit with a built-in program memory to which the CPU can write data, the control circuit controlling the image processor by executing a program stored in the program memory, a plurality of operational circuits, each of which performs a type of operation according to setting information on input data and outputs an operation result, a plurality of internal memories that temporarily store operation results of the plurality of operational circuits, a plurality of registers that hold (i) first information specifying, for each one of the plurality of operational circuits, an input source of data to be processed, (ii) second information specifying, for each one of the plurality of operational circuits, an output destination for data of an operation result, and (iii) the setting information for each one of the plurality of operational circuits in a case when the control circuit sets the first information, the second information and the setting information to the plurality of registers, and a selection circuit that (a) selects, according to the first information held in the register, image data from either the memory or the plurality of internal memories as input data for each one of the plurality of operational circuits, and (b) selects, according to the second information held in the register, either the memory or one of the plurality of internal memories as an output destination for an operation result of each one of the plurality of operational circuits, and wherein the control circuit executes a program stored in the program memory and, for each time each one of the plurality of operational circuits has executed processing of image data of one predetermined processing unit, sets (i) the first information, (ii) the second information, and (iii) the setting information to the plurality of registers.

According to another aspect, the present invention provides a one chip image processing circuit that functions as an image processor for connecting to a system bus to which a CPU that controls an image processing apparatus, a plurality of bus masters, and a DRAM are connected, comprising a microcomputer with a built-in program memory to which the CPU can write a program for the microcomputer, the microcomputer controlling the image processor by executing the program stored in the program memory, a plurality of operational circuits, each of which performs a type of operation according to setting information on input data and outputs an operation result, a plurality of internal memories that temporarily store operation results of the plurality of operational circuits, a plurality of registers that hold (i) first information specifying, for each one of the plurality of operational circuits, an input source of data to be processed, (ii) second information specifying, for each one of the plurality of operational circuits, an output destination for data of an operation result, and (iii) the setting information for each one of the plurality of operational circuits in a case where the first information, the second information and the setting information are set by the microcomputer to the plurality of registers, and a selection circuit that (a) selects, according to the first information held in the register, image data from either the memory or the plurality of internal memories as input data for each one of the plurality of operational circuits, and (b) selects, according to the second information held in the register, either the memory or one of the plurality of internal memories as an output destination for an operation result of each one of the plurality of operational circuits, wherein the microcomputer executes a program stored in the program memory and, for each time each one of the plurality of operational circuits has executed processing of image data of one predetermined processing unit, sets (i) the first information, (ii) the second information, and (iii) the setting information to the plurality of registers.

Further features of the present invention will become apparent from the following description of exemplary embodiments (with reference to the attached drawings).

DESCRIPTION OF THE EMBODIMENTS

Figure 1:
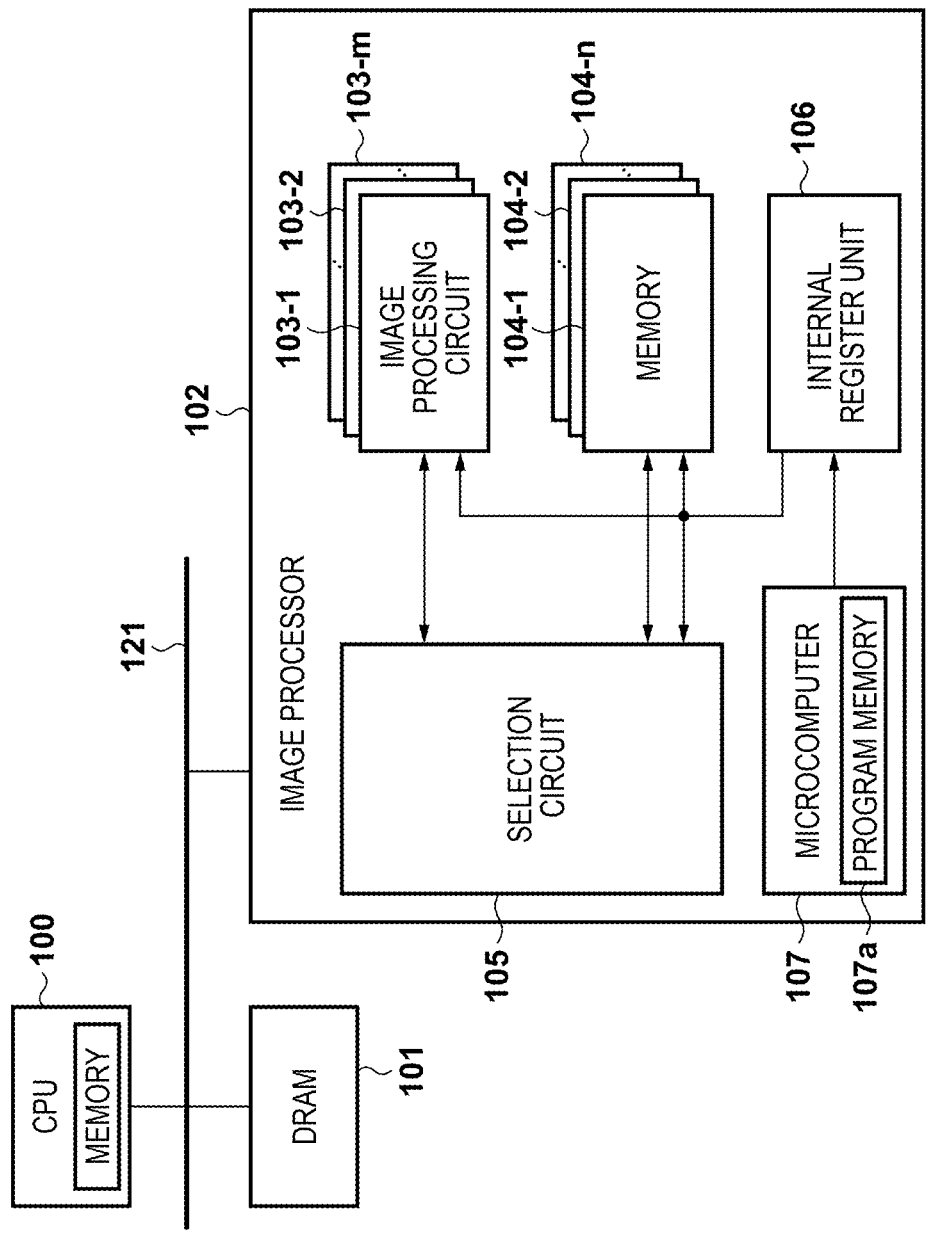
FIG. 1 is a block configuration diagram of a main portion according to an embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

Figure 6:
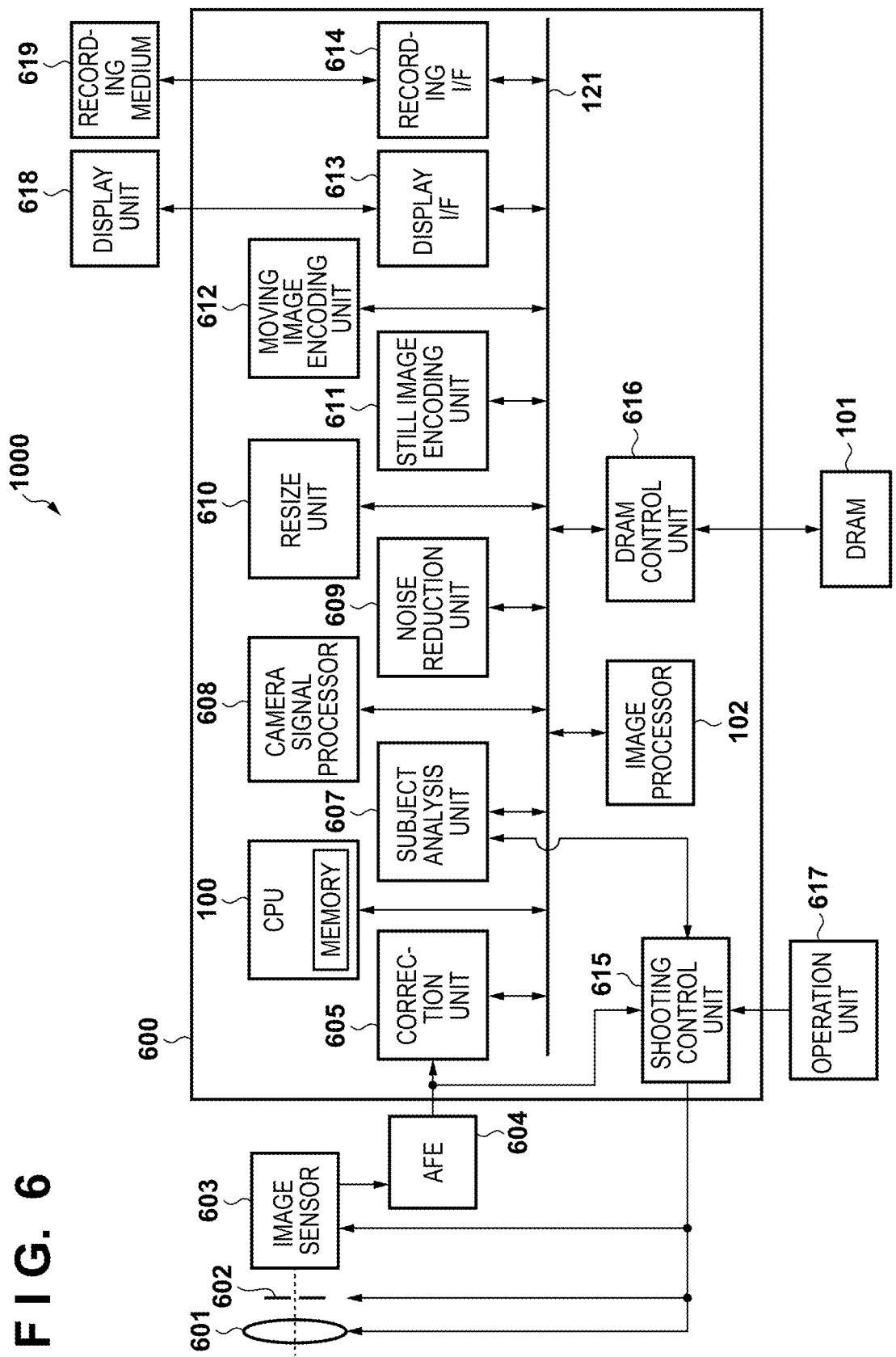
FIG. 6 is a block configuration diagram of an image capture apparatus to which the embodiment is applied.

FIG. 6 is a block diagram illustrating the configuration of an image capture apparatus 1000, which is an application of an image processing apparatus according to an embodiment.

A taking lens 601 forms a subject image on an imaging surface of an image sensor 603 by taking in light from a subject targeted for image capture through a diaphragm 602. The diaphragm 602 adjusts the amount of light that passes through the taking lens. On the imaging surface of the image sensor 603, a plurality of photoelectric conversion elements that generate electrical signals corresponding to the intensity of the incident light are arranged in rows and columns. Thus, the signals obtained via the photoelectric conversion elements arranged in rows and columns represent analog signals representing a formed image. The image sensor 603 outputs the analog signal (analog image signal) obtained via each photoelectric conversion element to an Analog Front End (AFE) 604. The image sensor 603, for example, can output an image of 4K (3840 horizontal pixels×2160 vertical pixels) per frame of 8K (7680 horizontal pixels×4320 vertical pixels) at sixty frames per second (fps) or one hundred twenty fps. The AFE 604 converts the input analog image signals to digital image data. The AFE 604, for example, can convert into a digital data of eight bits per pixel, but in another configuration, the digital data can be ten bits or twelve bits. Then, the AFE 604 outputs the image data obtained via conversion to an image processing core 600. The AFE 604 is configured as a single chip semiconductor integrated circuit (IC).

Next, the internal configuration of the image processing core 600 that processes the image data of the subject will be described. The image processing core 600 is configured as a single chip semiconductor integrated circuit (IC) independent from the AFE 604.

A correction unit 605 executes correction processing based on the specific characteristics of the image sensor 603 on the image data received from the AFE 604. A camera signal processor 608 executes development processing such as filter processing and color conversion on the image data. A noise reduction unit 609 performs noise removal on the image data. A resize unit 610 performs conversion to the number of pixels of the image to be recorded on the image data. Also, the resize unit 610 executes processing to convert to the number of pixels appropriate for the subject detection processing of a subject analysis unit 607.

A still image encoding unit 611 executes encoding processing to convert the image data into an image format for still image recording such as Joint Photographic Experts Group (JPEG). A moving image encoding unit 612 executes encoding processing to convert the image data into an image format for moving image recording such as H.264. A display I/F 613 is an interface unit for controlling the image output of a display unit 618. A recording I/F 114 executes processing for recording image data of moving images and still images on a recording medium 619.

The subject analysis unit 607 executes processing to detect a subject in image data after being resized by the resize unit 610 and track the movement of the subject. Also, the subject analysis unit 607 calculates the parameters for autofocus (AF) control to adjust the focal point of the taking lens 601 and automatic exposure (AE) control to adjust the amount of light passing through the diaphragm 602 and outputs the parameters to a shooting control unit 615. The shooting control unit 615 controls the driving of the taking lens 601, the diaphragm 602, and the image sensor 603 according to the parameters input from the subject analysis unit 607 and trigger signals based on user operation instructions.

A Central Processing Unit (CPU) 100 controls the entire system. The CPU 100 controls the entire image processing core 600 on the basis of a program stored in the built-in memory and controls the setting and execution of operational parameters for each functional module including the aforementioned subject analysis unit 607, the camera signal processor 608, and the like. Note that the program executed by the CPU 100 may be stored in an external memory instead of a built-in memory.

A system bus 121 is a bus connecting bus master functional modules to a bus slave functional module. The bus master functional modules include the correction unit 605, the CPU 100, the subject analysis unit 607, the camera signal processor 608, the noise reduction unit 609, the resize unit 610, the still image encoding unit 611, the moving image encoding unit 612, the display I/F 613, and the recording I/F 614. The bus slave functional module includes a DRAM control unit 616.

The DRAM control unit 616 controls (arbitrates) writing data to and reading out data from a DRAM 101 on the basis of a write transaction or a read transaction issued by a bus master described above.

An image processor 102 executes processing for adding various types of effects to the image data displayed on the display unit 618 or stored in the recording medium 619. For example, the image processor 102 executes peaking processing to add a predetermined color to predetermined portions in the displayed image, such as high-brightness portions and portions susceptible to subject blur. Also, the image processor 102 executes processing for enhancement display by adding a predetermined color the region in focus in the image on the basis of an analysis result from the subject analysis unit 607. The detailed configuration of the image processor 102 will be described below.

The Dynamic Random Access Memory (DRAM) 101 is a large-capacity volatile storage apparatus connected to the image processing core 600. The DRAM 101, for example, is a standard memory device such as a Low Power Double Data Rate 4 Synchronous DRAM (LPDDR4 SDRAM). The DRAM 101 is controlled by predetermined commands from the DRAM control unit 616 and exchanges data with the DRAM control unit 616. Also, the DRAM 101 is used to store temporary image data to be processed by the bus master functional modules described above and to store programs to be executed. The DRAM 101 is configured as a single chip IC different from the image processing core 600.

An operation unit 617 includes an operation member such as various types of switches, buttons, touch panels, and the like, that can be operated by a user. The user issues instructions to the image capture apparatus 1000 by operating the operation unit 617. The display unit 618 includes a display member such as a liquid crystal panel and displays a captured image, various types of menu screens, and the like. The recording medium 619 is a random access storage medium such as a memory card.

Next, the image processor 102 will be described with reference to FIG. 1. FIG. 1 is a diagram illustrating the image processor 102 inside the image processing core 600 and the related configuration.

The image processor 102 includes a plurality of image processing circuits 103-1, 103-2, ..., 103-$m$, a plurality of memories 104-1, 104-2, ..., 104-$n$, a selection circuit 105, an internal register unit 106, and a microcomputer 107.

The image processing circuits (operational circuits) 103-1, 103-2, ..., 103-$m$ each executes relatively simple operation processing on an image. Also, the memories 104-1, 104-2, ..., 104-$n$ are each configured of a memory element with an access speed sufficiently faster than that of the DRAM 101. Hereafter, unless otherwise indicated, a discretionary one of the image processing circuits 103-1, 103-2, ..., 103-$m$ will be referred to simply as the "image processing circuit 103". Also, in a similar manner, a discretionary one of the memories 104-1, 104-2, ..., 104-$n$ will be referred to as simply the "memory 104".

The selection circuit 105 controls the flow of the image data inside the image processor 102 by selecting or specifying the input source of the data to be processed by the image processing circuit 103 and by selecting or specifying the output destination for the image processing circuit 103.

Specifically, the selection circuit 105 selects, as the input source to the image processing circuit 103, whether to input data from the DRAM 101 or the memory 104 and, when the memory 104 is selected, selects which one from among the memories 104-1 to 104-$n$ to use as the input source. There is a maximum of two input sources for one image processing circuit 103. Also, the selection circuit 105 selects whether to set the DRAM 101 or the memory 104 as the output destination for the processed data that is the result of execution by the image processing circuit 103 and, when the memory 104 is selected, which one from among the memories 104-1 to 104-$n$ to select as the output.

The internal register unit 106 is configured of a plurality of registers that hold setting values associated with the selections by the selection circuit 105 and information indicating the operation modes of the image processing circuits 103-1 to 103-$m$ and various types of parameters.

The microcomputer 107 is a dedicated controller (control circuit) of the image processor 102 provided separate to the CPU 100. The microcomputer 107 internally includes a program memory 107$a$. The CPU 100 can write a program to the program memory 107$a$ inside the microcomputer 107. The microcomputer 107, under the control of the CPU 100, receives an instruction to start execution from the CPU 100 and executes the program stored in the program memory 107$a$. Then, the microcomputer 107 decides the value to set for the internal register unit 106 and performing writing. In this manner, the image processor 102 can execute various types of image processing.

As described above, the CPU 100 controls each block inside the image processing core 600. As described above, the DRAM 101 is a storage area for storing image data targeted for processing to be supplied to the image processor 102 and image data after processing by the image processor 102. Also, information other than image data, such as a control program for the CPU 100, may be stored.

As described above, the image processor 102 includes the plurality of image processing circuits 103-1, ..., 103-$m$ that each executes simple operation processing, the plurality of memories 104-1, ..., 104-$n$, the selection circuit 105, the internal register unit 106, and the microcomputer 107. The internal configurations of the image processor 102 are all configured as hardware circuits. Also, using these configurations, the image processor 102 executes processing for adding various types of effects to the image.

The image processor 102 according to the embodiment divides the image data targeted for processing stored in the DRAM 101 into predetermined processing units smaller than one frame, inputs them, and executes processing per divided processing unit. For example, the divided processing unit is image data corresponding to one line of the image. As long as the divided processing unit is equal to or less than the capacity of the memory 104, a different unit may be used. For example, one processing unit can be used for a predetermined number of pixels. To simplify the description, the divided processing unit according to the embodiment is image data corresponding to one horizontal line of the image. Also, the input source of the image data targeted for processing may not be the DRAM 101, and the output of another image processing circuit 103 may be received as the input image.

The image processing circuit 103 starts processing when a request instruction to start execution is received from the microcomputer 107. Also, the image processing circuit 103 includes a built-in operation device that performs various types of operations set by the internal register unit 106 and counter that counters the number of pixels input. When the number of pixels set by the internal register unit 106 is counted by the counter, the image processing circuit 103 notifies the microcomputer 107 that processing has ended for the target number of pixels. Also, when the image processing circuit 103 issues a notification, the count number of the counter is reset, the processing is stopped, and the image processing circuit 103 waits for an instruction to start processing from the microcomputer 107.

The memory 104 is a memory with an access speed sufficient faster than that of the DRAM 101. The memory 104 is configured of a Static Random Access Memory (SRAM), for example. The memory 104 includes the capacity for storing at least one piece of image data corresponding to the processing unit of the image processing circuit 103. The memory 104 is used as memory for temporarily storing the intermediate operation result of the image processing by the image processor 102. In other words, the image processor 102 according to the embodiment does not output the intermediate operation result during image processing to the external DRAM 101. In this manner, access to the DRAM 101 by the image processor 102 is at least performed only at the start of reading and when the final processing result is written. Thus, since access for writing the intermediate operation result to the DRAM 101 during the image processing is not required by the image processor 102, an increase in the bus band of the system bus 121 can be suppressed. Also, the effects on the access of other bus masters of the system bus 121 can be suppressed.

Also, the memory 104 according to the embodiment operates in either a write mode or a read mode according to an instruction from the microcomputer 107. The memory 104 includes a counter for counting the number of pixels in a similar manner to the image processing circuit 103. For example, in the case of the write mode, the memory 104 receives a start storage instruction from the microcomputer 107, starts the input of the image data, and then executes processing to store the input data as well as counting of the input data number via the counter. Then, when the count value of the counter reaches a value set by the internal register unit 106, the memory 104 notifies the microcomputer 107 of storage completion, resets the count value of the counter, and waits for a start storage instruction from the microcomputer 107. On the other hand, in the case of the read mode, the memory 104 receives a start reading instruction from the microcomputer 107, starts the output of the data stored in the memory 104, and then counts the output data number. Then, when the count value of the counter reaches a value set by the internal register unit 106, the memory 104 notifies the microcomputer 107 of output completion, resets the count value of the counter, and waits for a start reading instruction from the microcomputer 107.

The internal register unit 106 is configured of a plurality of registers (storage elements) that store values, parameters, and the like, set for the image processing circuit 103, the memory 104, and the selection circuit 105. During the processing of one line of data corresponding to the divided processing unit by the image processor 102, the value of the internal register unit 106 is controlled to not change. Then, when the processing of one line of image data is complete, the value of the internal register unit 106 is changed to the value for the data processing of the next line. Thus, the internal register unit 106 has a double bank configuration. In other words, while the image processor 102 is executing the processing of one line according to the value set for a first bank of the internal register unit 106, the microcomputer 107 sets a second bank with the various types of parameters for the next line of processing. Then, when the image processor 102 has completed the processing of one line according to the value set for the first bank, the microcomputer 107 changes the value of the internal register unit 106 to the value set for the second bank. The processing is instantly switched to the next line, and processing is started. Naturally, while the image processor 102 is executing the processing of one line according to the value set for the second bank, the microcomputer 107 sets the first bank with the various types of parameters for the next line of processing.

The microcomputer 107 has a dedicated program memory 107a and performs settings for the internal register unit 106, and control of the image processing circuit 103 and the memory 104 on the basis of a program written to the program memory 107a. The CPU 100 both writes the program to the program memory 107a of the microcomputer 107 and instructs the microcomputer 107 to start execution.

The image processing circuit 103 requires a certain amount of time to execute the processing of image data corresponding to one divided processing unit. For example, if the throughput of the image processing circuit 103 is one pixel per clock, the amount of time corresponding to two thousand clocks is needed to process image data of two thousand pixels. It is sufficient that the microcomputer 107 has the performance to complete the calculation and setting of the setting value of the next processing unit for the internal register unit 106 within the amount of time. If the microcomputer 107 has such performance, a reduction in the processing performance of the image processor 102 will not be caused by the processing speed of the microcomputer 107. In other words, it is sufficient that the microcomputer 107 can perform an operation of the setting value for the next divided processing unit within the processing time of one divided processing unit, and there is no demand for high performance. Accordingly, the cost can be reduced.

Figure 4:
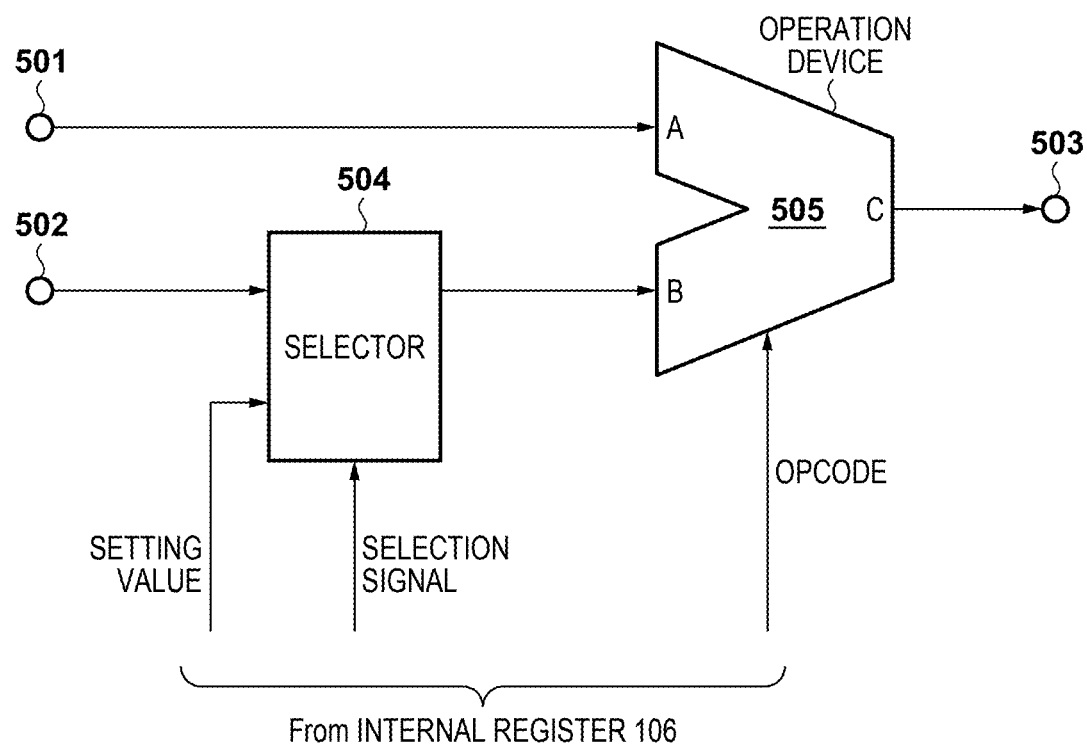
FIG. 4 is a circuit configuration diagram of a first type image processing circuit according to the embodiment.
Figure 5:
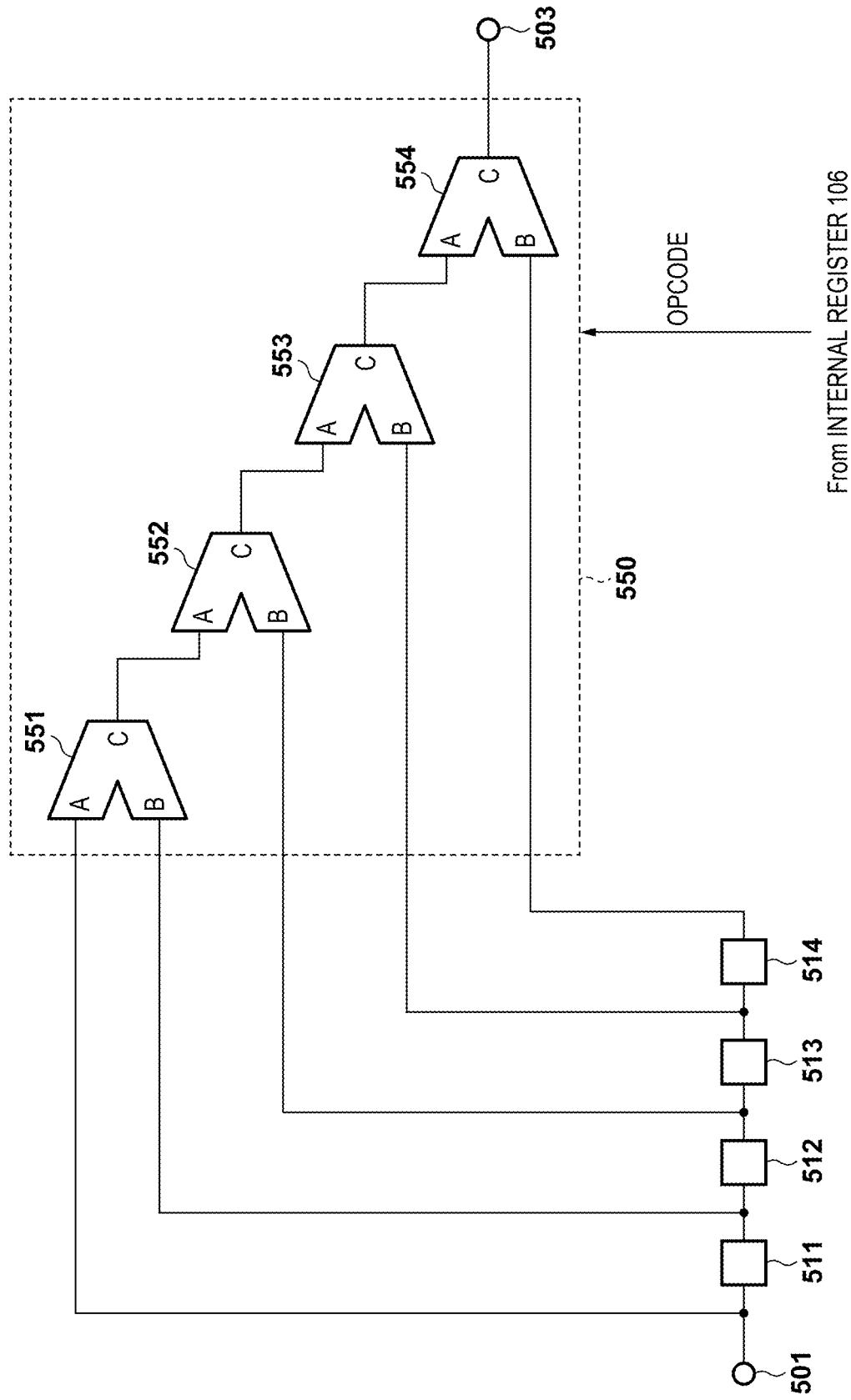
FIG. 5 is a circuit configuration diagram of a second type image processing circuit according to the embodiment.

Next, specific examples of the plurality of image processing circuits 103-1 to 103-$m$ included in the image processor 102 according to the embodiment will be described. The image processing circuits 103-1 to 103-$m$ according to the embodiment have the configuration of one of two types of circuits. One type is the circuit configuration illustrated in FIG. 4, and the other type is the circuit configuration illustrated in FIG. 5. Hereafter, the image processing circuit 103 with the configuration in FIG. 4 is referred to as a first type image processing circuit, and the image processing circuit 103 with the configuration in FIG. 5 is referred to as a second type image processing circuit. Note that, in FIGS. 4 and 5, for simplicity's sake, the counter is not illustrated.

The first type image processing circuit illustrated in FIG. 4 includes two input terminals 501 and 502, a single output terminal 503, a selector 504, and an operation device 505. The operation device 505 performs the type of operation according to an operation code (OPCODE) set in the internal register unit 106 on input A and B and outputs the operation result via output C. The operation types include the four arithmetic operations (+, −, ×, /), the logical operations (AND, OR, XOR), and bit shift.

The selector 504 selects the data from the input terminal 502 or the values set by the internal register unit 106 according to a selection signal from the internal register unit 106 and supplies this as the input B of the operation device 505.

In the configuration described above in this example, "addition" is set as the operation code for the operation device 505 and the input terminal 502 is set to be selected by the selector 504 according to the selection signal. When the input terminal 501 inputs data of the i-th line of image data and the input terminal 502 inputs data of the i+1-th line of image data, the first type image processing circuit in FIG. 4 functions as a circuit that outputs the result of adding together two pixels adjacent in the vertical direction.

Also, in this example, "bit shift" is set as the operation code for the operation device 505 and the setting value is set to be selected from the internal register unit 106 by the selector 504. When the operation device 505 performs a bit shift operation and the value of the input B is positive, the value of the input A is shifted left by the value of the input B. When the value of the input B is negative, the value of the input A is shifted to the right by the value of input B. Then, in this example, the image data or a line of data is input to the input terminal 501, and the setting value "−1" set by the internal register unit 106 is selected by the selector 504. In this case, the operation device 505 functions as a circuit that outputs the result (equivalent to operating ½ the value of the input A) of shifting the value of the input A one bit to the right according to the "−1" indicated by the input B. The other types of operation codes can be understood from the description above and thus will not be described.

The second type image processing circuit illustrated in FIG. 5 includes a single input terminal 501, a single output terminal 503, delays 511 to 514, and an operation unit 550. The delays 511 to 514 each latch input data in response to a clock signal. In other words, the data of four pixels adjacent in the horizontal direction (in a time series) is held by the delays 511 to 514. By adding this to the current input data, this means that the data of five consecutive pixels in the horizontal direction can be targeted for processing. The operation unit 550 is configured of operation devices 551 to 554. The operation devices 551 to 554 executes operation processing according to an operation code in a similar manner to the operation device 505 of the first type image processing circuit. However, for the operation devices 551 to 554 of the second type image processing circuit, two types, addition and subtraction, are sufficient. Accordingly, the circuit configuration of the operation device can be simplified. Also, the operation devices 551 to 554 each can perform an operation to nullify (or forcibly make the value of the input B zero) the input B via an operation code.

For example, when the operation code "addition" is set for the operation device 551 and an operation code for nullifying the input B is set for the other operation devices 552 to 554, the addition result of the operation device 551 is output unchanged from the operation device 554. In this manner, the second type image processing circuit functions as a circuit that outputs the addition result of two pixels adjacent in the horizontal direction.

Also, it can be understood that, depending on the setting, it can be made to function as a circuit that outputs the addition result of three to five pixels adjacent in the horizontal direction. Note that the number of latches and operation devices as illustrated in FIG. 5 is not particularly limited, and it is sufficient that the configuration is appropriate for the required number of pixels in the horizontal direction.

By combining one or more of the first and second type image processing circuits and the memory 104, a smoothing filter with a 4×4 pixel size can be formed, for example.

Figure 7:
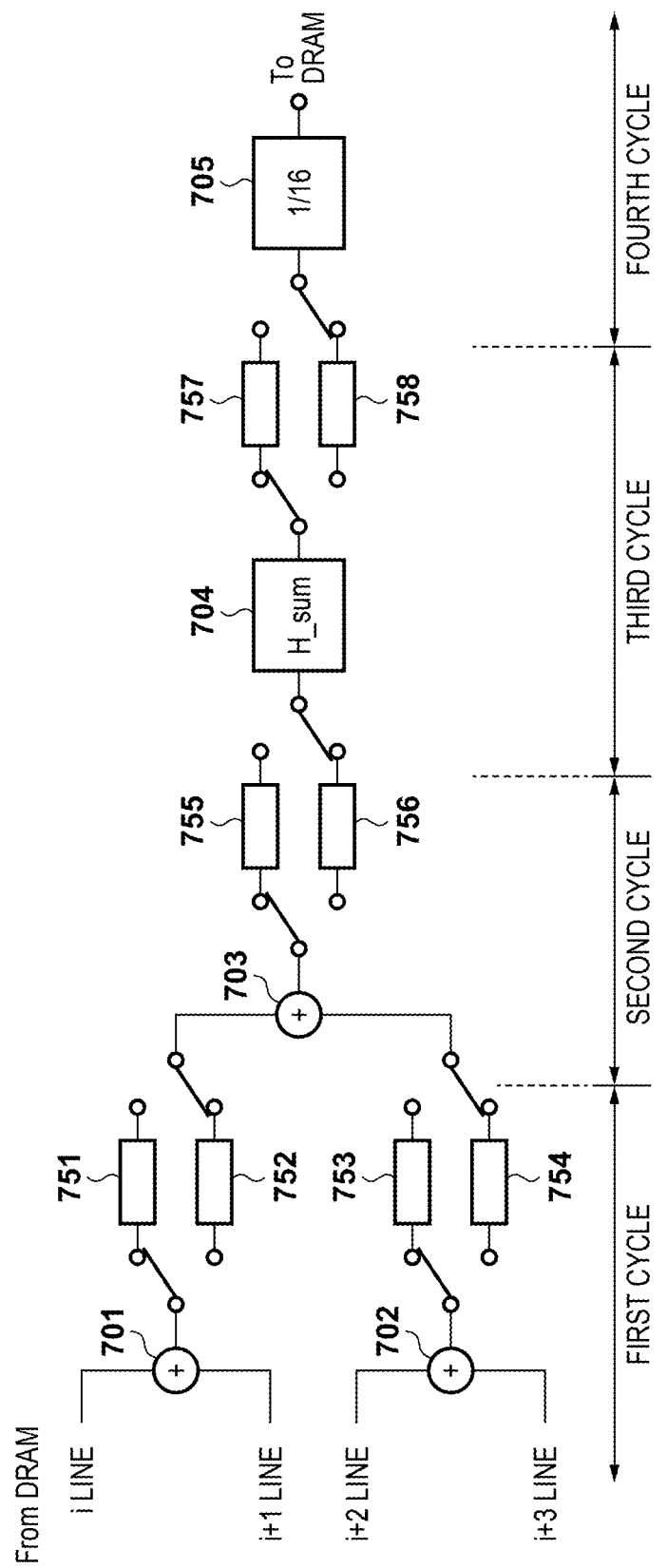
FIG. 7 is an equivalent circuit configuration diagram of when the image processor functions as a smoothing filter.

FIG. 7 is an equivalent circuit diagram of a smoothing filter with a 4×4 pixel size. In the diagram, reference signs 701 to 705 denote the image processing circuits 103, and reference signs 751 to 758 denote the individual memories inside the memory 104.

An adder 701 is input with the data of the i-th line of the image stored in the DRAM 101 and the i+1-th line, performs addition for the pixels at the same position in the horizontal direction of each line, and stores the result in either the memory 751 or the memory 752 (the memory 751 in the diagram). Note that the adder 701 alternately switches between output destination memories per cycle unit.

An adder 702 is input with the data of the i+2-th line of the image stored in the DRAM 101 and the i+3-th line, performs addition for the pixels at the same position in the horizontal direction of each line, and stores the result in either the memory 753 or the memory 754 (the memory 753 in the diagram). Note that the adder 702 alternately switches between output destination memories per cycle unit.

An adder 703 is input with data from two memories (in the case illustrated in the diagram, the memories 752 and 754) storing the operation processing result of the cycle one previous via the adders 701 and 702, and adds them together. Then, the adder 703 stores the addition result in either the memory 755 or the memory 756 (the memory 755 in the diagram). Note that the adder 703 also alternately switches between output destination memories per cycle unit.

A horizontal summer 704 calculates the total of the four pieces of consecutive data in the horizontal direction from the memory (in the case of the diagram, the memory 756) storing the operation result of the cycle one previous via the adder 703. Then, the horizontal summer 704 stores the summation result in either the memory 757 or the memory 758 (in the case of the diagram, the memory 757). Note that the horizontal summer 704 also alternately switches between output destination memories per cycle unit.

A divider 705 is input with data from the memories (in the case illustrated in the diagram, the memory 758) storing the operation result of the cycle one previous via the horizontal summer 704, divides the data by sixteen, and outputs the division result to the DRAM 101.

As described above, the adders 701, 702, and 703 are each first type image processing circuits. By making the selector 504 inside the first type image processing circuit select the input terminal 502 and setting the operation code of "addition" for the operation device 505, the first type image processing circuit can be made to function as a two input one output adder.

The horizontal summer 704 is a second type image processing circuit. By setting the operation code of "addition" for the operation devices 551 to 553 inside the operation unit 550 of the second type image processing circuit and setting the input B to nullify for the operation device 554, the second type image processing circuit can be made to function as a summer for four pieces of data consecutive in the horizontal direction.

The divider 705 is a first type image processing circuit. By making the selector 504 inside the first type image processing circuit select a setting value ("−4") from the internal register unit 106 and setting the operation code of "bit shift" for the operation device 505, the first type image processing circuit can be made to function as a divider that shifts the input data four bits to the right (equivalent to dividing by sixteen). Note that, by making the selector 504 inside the first type image processing circuit select a setting value ("16") from the internal register unit 106 and setting the operation code of "divide" for the operation device 505, the first type image processing circuit can be made to function as a divider. The divider 705 outputs the division result to the DRAM 101 as a smoothing processing result.

Note that, in this example, Direct Memory Access (DMA) transfer is used to transfer image data from the DRAM 101 to the adders 701 and 702, and to transfer data from the divider 705 to the DRAM 101. Thus, the image processor 102 may include a built-in Direct Memory Access Controller (DMAC).

The memories 751 to 758 illustrated in FIG. 7 are switched between writing and reading at the time when the data processing of one line is complete. The switching may be at the time of bank switching of the internal register unit 106 described above. The data processing of one line is determined to be complete by the microcomputer 107 when a notification indicating the completion of operation processing of the number of pixels corresponding to the division unit is received from (the counter of) the in-use image processing circuit 103 per cycle during execution as described above.

With the configuration in FIG. 7, data of the first four lines of the image stored in the DRAM 101 is supplied to the adders 701 and 702, and then the amount of time corresponding to four cycles as illustrated is required for the time period until the smoothing processing result is output by the divider 705. However, after the smoothing processing result for the data of the first four lines of the image is output to the DRAM 101, by executing the adders 701 and 702, the adder 703, the horizontal summer 704, and the divider 705, in parallel, pipeline processing can be implemented. In other words, the function of a four input one output, high-speed smoothing filter circuit can be implemented.

Note that the setting for the internal register unit 106 in the first cycle and the third cycle illustrated in FIG. 7 is the same. Also, the setting for the internal register unit 106 in the second cycle and the fourth cycle is the same. In other words, after the setting for the first two cycles is performed for the internal register unit 106, the microcomputer 107 only needs to perform bank switching each time one line of processing ends. Also, in the time period from the first cycle to the third cycle in which data of the first four lines of the image of the DRAM 101 is input into the adders 701 and 702, meaningless data is output from the divider 705. Thus, the microcomputer 107 performs control to not allow writing to the DRAM 101 in this time period.

Also, the microcomputer 107 notifies the CPU 100 of the completion of processing of a divided processing unit each time the processing of a divided processing unit ends, according to a program stored in the program memory 107a. When the microcomputer 107 receives the execution instruction for the next processing unit from the CPU 100, the microcomputer 107 repeats the start of the corresponding processing.

In the example described above, the image processor 102 functions as a smoothing filter with a 4×4 pixel size. However, it should be clear that by combining the required number of first type image processing circuits and second type image processing circuits inside the image processing circuit 103 and the required number of memories 104, the image processor 102 can be made to function as another type of image processor. To implement the target image processing, the required number of first type image processing circuits and second type image processing circuits inside the image processing circuit 103, and the required number of memories 104 are all selected by a program written to the program memory 107a by the CPU 100.

This advantage of the image processor 102 according to the embodiment has been described above. Next, a control method for an image processing apparatus according to the embodiment will be described using the flowchart in FIG. 2.

Figure 2:
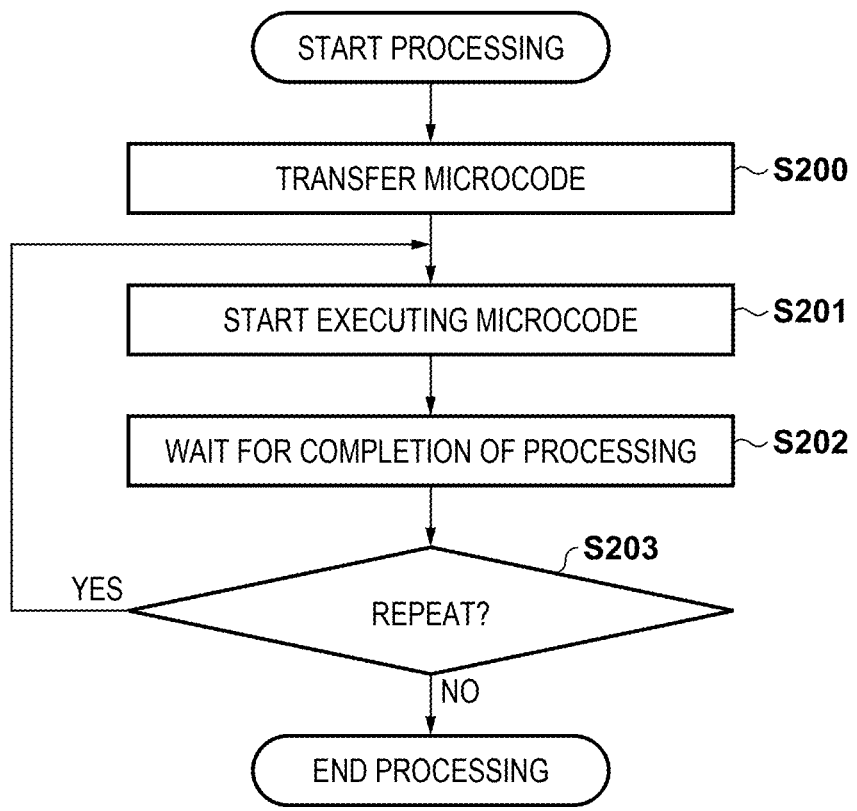
FIG. 2 is a flowchart of control processing executed by a CPU.

FIG. 2 is a flowchart of a program executed by the CPU 100 and is an extract of the processing flow when the image processor 102 according to the embodiment is used.

Processing not related to the use of the image processor 102 executed by the CPU 100 is not the focus of the present embodiment and will thus be skipped.

In step S200, the CPU 100 reads out a program (microcode) for the image processor 102 to execute the target type of image processing from the memory inside the CPU 100 and transfers the program to the program memory 107a of the microcomputer 107 inside the image processor 102.

In step S201, the CPU 100 instructs the microcomputer 107 of the image processor 102 to start execution. In this manner, the microcomputer 107 starts executing the program stored in the program memory 107a, sets the various types of information for the internal register unit 106, and starts the processing of one divided processing unit (one cycle).

In step S202, the CPU 100 waits for a notification of the completion of processing of one divided processing unit from the microcomputer 107. Then, when the CPU 100 receives the notification of processing completion from the microcomputer 107, the processing proceeds to step S203.

In step S203, the CPU 100 determines whether or not there is an unprocessed processing unit. Then, when the CPU 100 determines that there is an unprocessed processing unit, the processing returns to step S201. On the other hand, when the CPU 100 determines that the processing of all of the processing units is complete, the present processing ends.

Note that, in the example in FIG. 2, the CPU 100 determines whether or not a notification indicating that processing of the divided processing units is complete has been received from the microcomputer 107. However, the CPU 100 may receive a notification of the completion of the processing of the divided processing units from the microcomputer 107 as an interrupt signal. In this case, during the interrupt processing, it is sufficient that the CPU 100 determines whether or not there is an unprocessed processing unit, freeing up the processing power of the CPU 100 to be used more effectively in other tasks.

Figure 3:
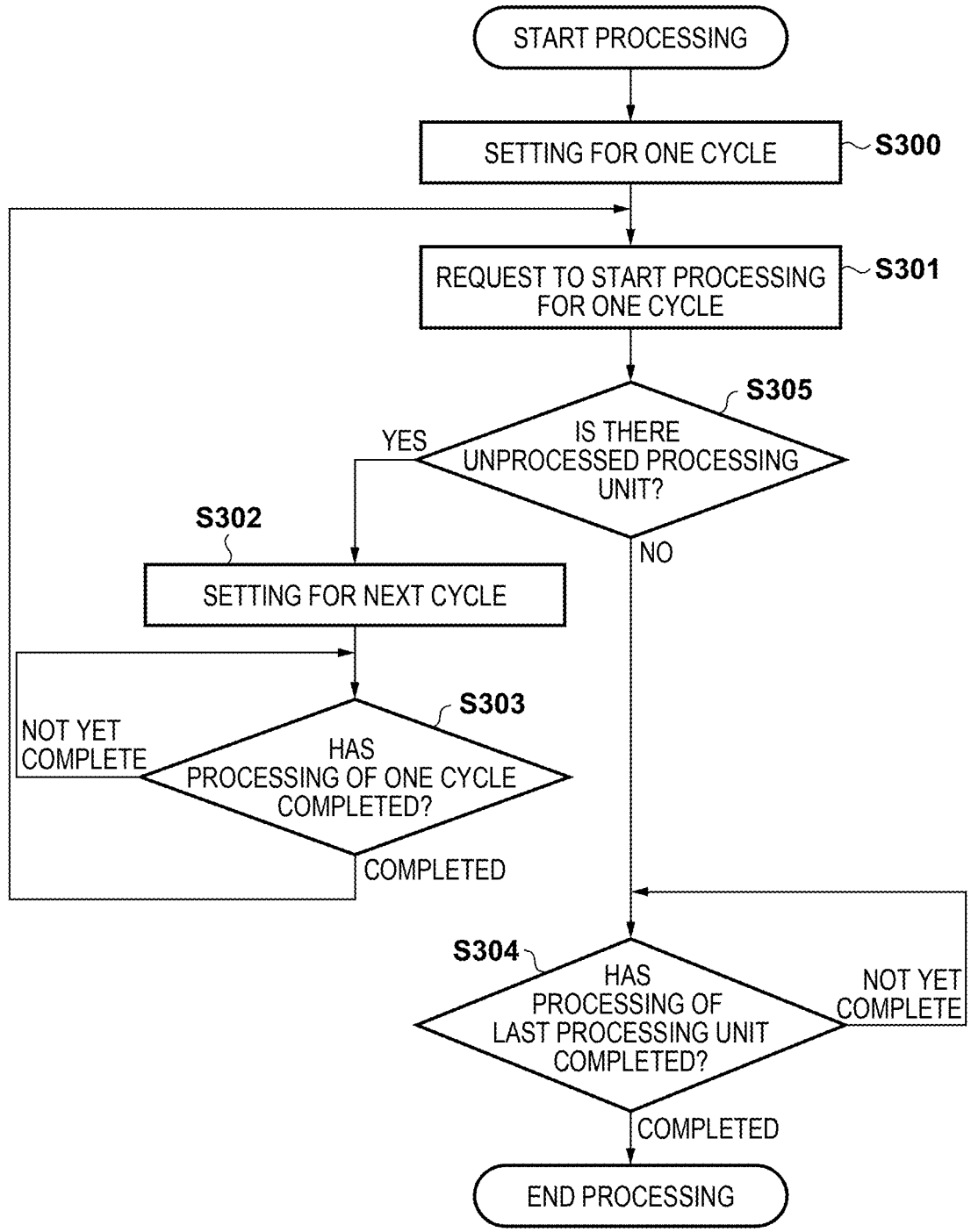
FIG. 3 is a flowchart of control processing executed by a microcomputer of an image processor.

Next, the processing of the microcomputer 107 will be described according to the flowchart in FIG. 3. The processing is started by the CPU 100 storing the program to be executed by the microcomputer 107 in the program memory 107a and issuing a start execution instruction (step S201) to the microcomputer 107.

In step S300, the microcomputer 107 sets the required various types of settings for the processing of one cycle, in other words, one divided processing unit, for one of the banks of the internal register unit 106. The content to be set includes operation codes for the image processing circuit 103 to be used, various types of parameters, processing data numbers (a counter target value), and information indicating an input source of targeted data that is to be processed by the image processing circuit 103 and a destination to which the processed result is to be output from the image processing circuit 103.

In step S301, the microcomputer 107 requests all of the image processing circuits 103 to be used in the current one cycle of processing to start processing.

In step S305, the microcomputer 107 determines whether or not an unprocessed processing unit remains in the image targeted for processing. When it is determined that there is an unprocessed processing unit in the image targeted for processing, the microcomputer 107 proceeds the processing to step S302.

In step S302, the microcomputer 107 sets the value for processing the next cycle for the other one bank of the internal register unit 106.

In step S303, the microcomputer 107 waits for the completion of the processing of the set one cycle. Specifically, the microcomputer 107 waits for a processing complete notification from all of the image processing circuits 103 that started processing in step S301.

When the processing of one cycle is complete, the microcomputer 107 notifies the CPU 100 that the processing of one cycle has ended and changes the value for the internal register unit 106 to the value set in step S302 (switches banks). Then, the microcomputer 107 returns the processing to step S301 and waits for a start instruction from the CPU 100.

Thereafter, the processing from step S301 to step S303 is repeated until there are no more unprocessed processing units.

When the processing of the last processing unit is started, the microcomputer 107 proceeds the processing from step S305 to step S304. In step S304, the microcomputer 107 waits for the processing of the last processing unit to be completed. When the processing of the last processing unit is complete, the processing of all of the image data is complete and thus the present processing ends.

As described above, an image processor according to the present embodiment includes a plurality of image processing circuits that execute relatively simple operation processing, a plurality of internal memories that can be accessed at high-speeds by an external memory, a selection circuit for selecting a bus for image data to pass through, and a register unit for setting a parameter and/or operation code relating to operations performed by the selection circuit and the image processing circuits, and further includes a programmable microcomputer that can write data to the register unit. In this manner, via the image processing circuits to be used, the parameters and operation codes set for the image processing circuits, and the combination of internal memories, the image processor can function as various types of image processing circuits. Also, the intermediate data generated in the image processing process is stored in the internal memory and not memory external to the image processor. Accordingly, the effects on the strain on the external bus region can be kept to a minimum, and the effects on other bus masters on the external bus can be kept to a minimum.

Normally, with an image processing apparatus applied to programmable image processing, when there is a plurality of image processing to be implemented, the processing is all executed by the single image processing apparatus. In the present embodiment, the image processing to be implemented is implemented by a combination of image processing circuits that each performs simple operations. Accordingly, the image processing to be implemented is broken into smaller operations, and one image processing circuit 103 is responsible for one of these units. Naturally, since there are few cases in which the image processing to be implemented cannot be cleanly broken into the same set of operations, three types or more may exist for the image processing circuit 103 to be able to implement all of the required operations.

Also, in the embodiment described above, the image processing core 600 is configured of a one chip IC, but the image processor 102 inside the image processing core 600 may be a one chip IC.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a central processing unit (CPU) connected to a system bus;
   an image processor connected to the system bus;
   a plurality of bus masters connected to the system bus; and
   a memory connected to the system bus and accessed by the CPU, the plurality of bus masters, and the image processor via the system bus,
   wherein the image processor includes:
      a control circuit with a built-in program memory to which the CPU can write data, the control circuit controlling the image processor by executing a program stored in the program memory;
      a plurality of operational circuits, each of which performs a type of operation according to setting information on input data and outputs an operation result;
      a plurality of internal memories that temporarily store operation results of the plurality of operational circuits;
      a plurality of registers that hold (i) first information specifying, for each one of the plurality of operational circuits, an input source of data to be processed, (ii) second information specifying, for each one of the plurality of operational circuits, an output destination for data of an operation result, and (iii) the setting information for each one of the plurality of operational circuits in a case when the control circuit writes the first information, the second information, and the setting information to the plurality of registers; and a selection circuit that (a) selects, according to the first information held in the registers, image data from either the memory connected to the system bus or the plurality of internal memories as input data for each one of the plurality of operational circuits, and (b) selects, according to the second information held in the registers, either the memory connected to the system bus or one of the plurality of internal memories as an output destination for an operation result of each one of the plurality of operational circuits, wherein the control circuit executes a program stored in the program memory and, for each time each one of the plurality of operational circuits has executed processing of image data of a single predetermined processing unit, writes (i) the first information, (ii) the second information, and (iii) the setting information to the plurality of registers, wherein each of the plurality of registers comprises two banks, each of which holds the first information, the second information, and the setting information, and, while the plurality of operational circuits are executing processing of image data of the single predetermined processing unit according to the first information, which is used for the processing of the image data of the single predetermined processing unit, the second information, which is used for the processing of the image data of the single predetermined processing unit, and the setting information, which is used for the processing of the image data of the single predetermined processing unit held in one of the two banks, the control circuit writes the first information, which is used for a processing of the image data of a next predetermined processing unit, the second information, which is used for the processing of the image data of the next predetermined processing unit, and the setting information, which is used for the processing of the image data of the next predetermined processing unit for the processing of the image data of the next predetermined processing unit in the other of the two banks.

2. The image processing apparatus according to claim 1, wherein the control circuit writes the first information, which is used for the processing of the image data of the single predetermined processing unit, to the resisters such that the memory connected to the system bus is selected as an input source of one of the plurality of operational circuits that first processes image data of the single predetermined processing unit, among the plurality of operational circuits, and writes the second information, which is used for the processing of the image data of the single predetermined processing unit to the registers such that, for each one of the plurality of operation circuits, one of the plurality of internal memories is selected as an output destination of an intermediate operation result before a target operation result is obtained for the image data of the single predetermined processing unit.

3. The image processing apparatus according to claim 2, wherein, the control circuit writes the second information, which is used for the processing of the image data of the single predetermined processing unit, to the registers such that the memory connected to the system bus is selected as an output destination of one of the plurality of operational circuits that outputs the target operation result for the image data of the single predetermined processing unit.

4. The image processing apparatus according to claim 1, wherein the setting information held in each of the plurality of registers includes a type of operation and a parameter for an operation.

5. The image processing apparatus according to claim 1, wherein operations executed by the plurality of operational circuits include four arithmetic operations, a logical operation, and a bit shift.

6. The image processing apparatus according to claim 1, wherein the plurality of operational circuits include a first type of operational circuit that outputs one operation result for two pieces of input data and a second type of operational circuit that performs an operation for a predetermined number of pieces of consecutive time-series data and performs an output.

7. The image processing apparatus according to claim 1, wherein the single predetermined processing unit is one line of image data.

8. The image processing apparatus according to claim 1, wherein the control circuit is a dedicated microcomputer of the image processor and is provided separate from the CPU.

9. The image processing apparatus according to claim 1, wherein the plurality of internal memories have a faster access speed than the memory connected to the system bus, and each of the plurality of internal memories has a capacity to at least be able to store one piece of image data corresponding to the single predetermined processing unit.

10. The image processing apparatus according to claim 9, wherein each of the plurality of internal memories is a static random access memory (SRAM) and the memory connected to the system bus is a dynamic random access memory (DRAM).

11. The image processing apparatus according to claim 1, wherein the image processor is a one chip integrated circuit (IC).

12. The image processing apparatus according to claim 1, wherein the CPU writes a program appropriate for a type of target image processing to the program memory.

13. A one chip image processing circuit that functions as an image processor for connecting to a system bus to which a central processing unit (CPU) that controls an image processing apparatus, a plurality of bus masters, and a dynamic random access memory (DRAM) are connected, the one chip image processing circuit comprising:

a microcomputer with a built-in program memory to which the CPU can write a program for the microcomputer, the microcomputer controlling the image processor by executing the program stored in the program memory;

a plurality of operational circuits, each of which performs a type of operation according to setting information on input data and outputs an operation result;

a plurality of internal memories that temporarily store operation results of the plurality of operational circuits;

a plurality of registers that hold (i) first information specifying, for each one of the plurality of operational circuits, an input source of data to be processed, (ii) second information specifying, for each one of the plurality of operational circuits, an output destination for data of an operation result, and (iii) the setting information for each one of the plurality of operational circuits in a case when the first information, the second information, and the setting information are written by the microcomputer to the plurality of registers; and a selection circuit that (a) selects, according to the first information held in the registers, image data from either the DRAM or the plurality of internal memories as input data for each one of the plurality of operational circuits, and (b) selects, according to the second information held in the register, either the DRAM or one of the plurality of internal memories as an output destination for an operation result of each one of the plurality of operational circuits, wherein the microcomputer executes a program stored in the program memory and, for each time each one of the plurality of operational circuits has executed processing of image data of a single predetermined processing unit, writes (i) the first information, (ii) the second information, and (iii) the setting information to the plurality of registers, wherein each of the plurality of registers comprises two banks each of which holds the first information, the second information, and the setting information, and, while the plurality of operational circuits are executing processing of image data of the single predetermined processing unit according to the first information, which is used for the processing of the image data of the single predetermined processing unit, the second information, which is used for the processing of the image data of the single predetermined processing unit, and the setting information, which is used for the processing of the image data of the single predetermined processing unit held in one of the two banks, the control circuit writes the first information, which is used for a processing of the image data of a next predetermined processing unit, the second information, which is used for the processing of the image data of the next predetermined processing unit, and the setting information, which is used for the processing of the image data of the next predetermined processing unit for the processing of the image data of the next predetermined processing unit in the other of the two banks.

* * * * *